US012227230B2

(12) United States Patent
Grech (10) Patent No.: US 12,227,230 B2
(45) Date of Patent: Feb. 18, 2025

(54) RECREATIONAL VEHICLE WITH CAMOUFLAGED UTILITY HOOK-UP COMPARTMENT

(71) Applicant: Edward P Grech, Riverside, CA (US)

(72) Inventor: Edward P Grech, Riverside, CA (US)

( * ) Notice: Subject to any disclaimer, the term of this patent is extended or adjusted under 35 U.S.C. 154(b) by 135 days.

(21) Appl. No.: 17/515,240

(22) Filed: Oct. 29, 2021

(65) Prior Publication Data

US 2023/0132962 A1    May 4, 2023

(51) Int. Cl.
*B62D 25/24*    (2006.01)
*B60P 3/36*    (2006.01)
*E03F 1/00*    (2006.01)

(52) U.S. Cl.
CPC ............... *B62D 25/24* (2013.01); *B60P 3/36* (2013.01); *E03F 1/008* (2013.01)

(58) Field of Classification Search
CPC ............ B62D 25/24; B60P 3/36; E03F 1/008
See application file for complete search history.

(56) References Cited

U.S. PATENT DOCUMENTS

| | | | | |
|---|---|---|---|---|
| 4,906,033 A * | 3/1990 | Sargent | ...................... | E05D 3/12 292/DIG. 43 |
| 5,746,466 A * | 5/1998 | Antos | .................... | B60J 5/0491 296/218 |
| 5,979,972 A * | 11/1999 | Gehman | ................... | B60P 3/34 296/184.1 |
| 6,352,088 B1 * | 3/2002 | Stegall | ..................... | B60R 15/00 141/1 |
| 6,607,009 B2 * | 8/2003 | Schoellhorn | ............ | B60R 15/00 137/355.16 |
| 6,749,251 B1 * | 6/2004 | Papsdorf | ................... | B60P 3/36 296/146.1 |
| 6,817,642 B1 * | 11/2004 | Warning | ................. | B60R 15/02 296/156 |
| 7,481,473 B1 * | 1/2009 | Warning | ................. | B60R 15/02 296/156 |
| 7,611,185 B2 * | 11/2009 | Allen | ...................... | B60R 11/06 280/830 |
| 9,126,535 B1 * | 9/2015 | Moore | .................. | B62D 25/168 |
| 9,211,847 B1 * | 12/2015 | Cox | ......................... | B60R 15/00 |
| 9,840,182 B2 * | 12/2017 | Gerzeny | ................... | B60P 3/36 |
| D879,666 S * | 3/2020 | Gerzeny | ...................... | D12/103 |

(Continued)

FOREIGN PATENT DOCUMENTS

AU    2013100488 C4 *    5/2013    ............. B60R 15/00

*Primary Examiner* — Jason S Morrow (57) ABSTRACT

A recreational vehicle includes an exterior side having an elongated strip extending from near the front of the vehicle towards the rear of the vehicle. A utility hook-up compartment in the exterior side includes a compartment door manually opened and closed to uncover and cover utility hook-up compartment, accessing the hook-up compartment upon manually opening the door and preventing access and concealing the hook-up compartment upon manually closing the door. The strip has first and second portions with exterior surfaces that provide a visual camouflage effect, hiding within the unitized strip itself the hook-up compartment door upon closure thereof and alignment of both portions. Door closure brings the first and second portions into alignment along a common longitudinal reference line to form an integrated unit.

20 Claims, 5 Drawing Sheets

(56) References Cited

U.S. PATENT DOCUMENTS

| | | | | |
|---|---|---|---|---|
| 2016/0007586 A1* | 1/2016 | Emanuel | ............... | B60R 15/00 |
| | | | | 296/208 |
| 2020/0063468 A1* | 2/2020 | Bacon | ..................... | E05B 9/08 |
| 2020/0231081 A1* | 7/2020 | Coons | ..................... | B60P 3/00 |

* cited by examiner

RECREATIONAL VEHICLE WITH CAMOUFLAGED UTILITY HOOK-UP COMPARTMENT

INCORPORATION BY REFERENCE

Any and all U.S. patents, U.S. patent applications, and other documents, hard copy or electronic, cited or referred to in this non-provisional patent application are incorporated herein by reference and made a part of this application.

DEFINITIONS

The words "comprising," "having," "containing," "holding," and "including," and other grammatical forms thereof, are intended to be equivalent in meaning and be open ended in that an item or items following any one of these words is not meant to be an exhaustive listing of such item or items, nor meant to be limited to only the listed item or items.

The word "rectangular" includes square.

BACKGROUND

Figure 1:
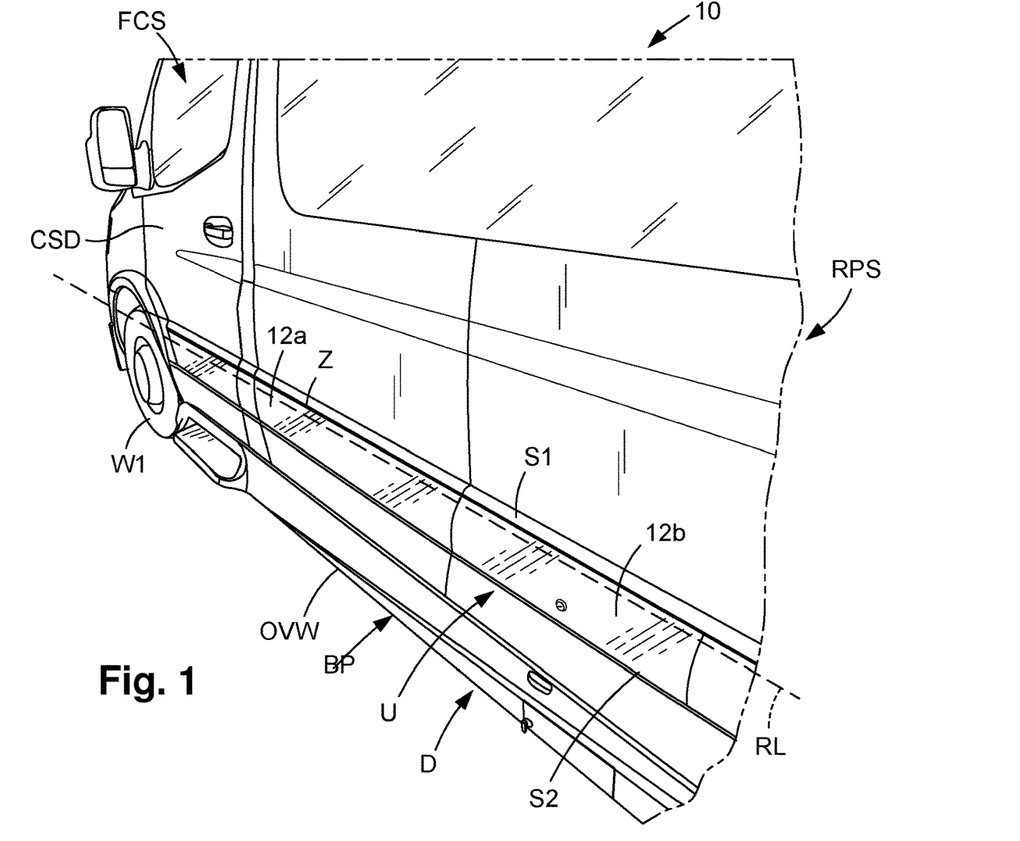
FIG. 1 is a perspective view showing a broken away section of one embodiment of my recreational vehicle with a camouflaged utility hook-up compartment looking along a driver's side of the vehicle towards the front of the vehicle.
Figure 1A:
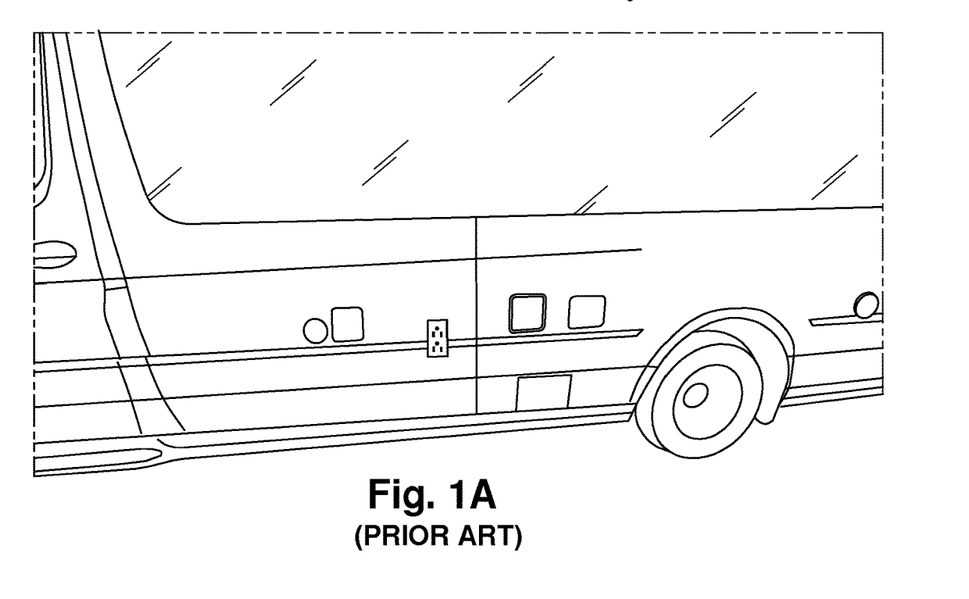
FIG. 1A is a side view of a typical recreational vehicle with utility hook-up connections on a side of the vehicle.
Figure 2:
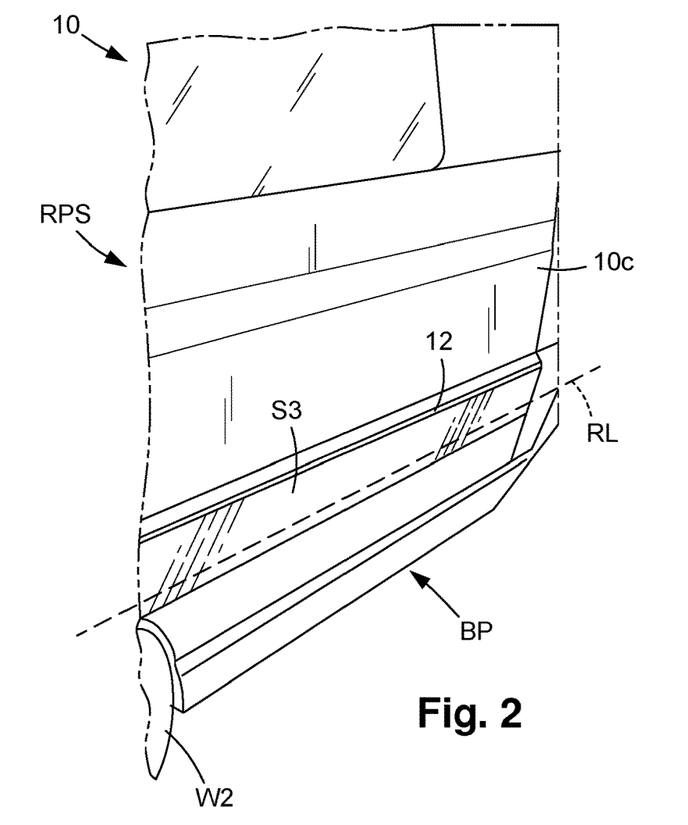
FIG. 2 is a perspective view showing a broken away section of the embodiment of my recreational vehicle shown in FIG. 1 looking along a driver's side of the vehicle towards the rear of the vehicle.

FIG. 1A illustrates a typical recreation vehicle having a number of utility outlet hook-ups in separate recesses in a side of the vehicle hidden behind spaced apart square shaped covers that are opened and closed manually. A linear strip extends between the front and rear wheels, and an electrical outlet intersects and divides the strip and two pieces, with some covers above and below the pieces scattered over the side of the vehicle. This is an unattractive and inconvenient manner of organizing access to the utility outlet hook-ups.

This background discussion is not intended to be an admission of prior art.

SUMMARY

My recreation vehicle has one or more of the features depicted in the embodiment discussed in the section entitled "DETAILED DESCRIPTION OF ONE ILLUSTRATIVE EMBODIMENT." These features are not listed in any rank order nor is this list intended to be exhaustive. The claims that follow define my recreation vehicle with concealed and camouflaged utility outlet hook-ups, distinguishing it from the prior art; however, without limiting the scope of my recreation vehicle as expressed by these claims, in general terms, some, but not necessarily all, of its features are:

One, the recreation vehicle has along an exterior side of the vehicle a broad elongated strip at least 5 inches wide that conceals utility outlet hook-ups underneath the strip. The strip is divided into first and second strip portions, and they may have exterior light reflective surfaces. These surfaces may be the same, for example, both mirrored surfaces reflecting images of nearby people or objects. One strip portion functions as a hinged door that when closed covers and hides a utility hook-up compartment. Door closure brings the first and second portions into alignment along a common longitudinal reference line to form an integrated unit. The strips' exterior light reflective surfaces are aligned with each other and lie in the same plane upon door closure. This provides a visual camouflage effect, providing a unified strip to hide within itself the now undistinguished one strip portion functioning as a hook-up compartment door.

Two, the first and second strip portions move from alignment to non-alignment upon opening the compartment door, and returned to alignment upon door closure. The first and second portions are separated, but only slightly so the door portion avoids jamming when closed. In different embodiments they may include: One embodiment with each portion having the same along their entire combined length; or both portions having the same cross-sectional configuration; or both portions having the same cross-sectional configuration; or both portions having the identical exterior surfaces; or both portions having the same cross-sectional configuration; or both portions lying in the same plane; or surfaces of both portions curved or flat, but both in assembly must be the same to achieve a uniform appearance.

Three, the recreational vehicle has a forward cab section and a rear passenger section joined by the exterior side. The exterior side of the vehicle is a side that includes a cab section door for entry into the cab section of the vehicle. There is a front wheel outward of the cab section door and a rear wheel near the rear of the rear passenger section of the vehicle. The external elongated strip extends from near the front of the vehicle towards the rear of the vehicle. The assembled strip is continuous to form a unit when assembled, and has a generally rectangular configuration. The one portion of functioning as door covers a utility outlet hook-up compartment, which may include a recessed cubicle. The utility hook-up connectors are hidden in the utility outlet hook-up compartment away from view upon closure of the one door portion. The utility outlet hook-up compartment may include at least a connector for fresh water and a connector for electricity.

Four, the bottom of a lower horizontal section of the exterior side has a running board section in which is stored a concealed storage compartment. A shallow step along the bottom of this lower horizontal section has an outer vertical wall generally at a right angle to an inward projecting horizontal wall to form. The concealed storage compartment is hidden behind the outer vertical wall and includes a cavity in which is stored a retracted waste discharge hose. The concealed storage compartment includes a hinged door configured to be manually opened and closed to uncover and cover the retracted waste discharge hose, accessing the hose upon manually opening the door and preventing access and concealing the hose upon manually closing the storage compartment door. The retracted waste discharge hose is assembled within the storage compartment in a configuration enabling actuation by electricity.

Five, a cutaway segment in the outer vertical wall of the running board section has edges defining an open mouth with a predetermined configuration and dimensions. The hinged door has a perimeter with a predetermined configuration and dimensions the same as this open mouth so that, upon closure, the wall edges forming the perimeter of the open mouth are adjacent the perimeter of the compartment door, but not so close to jam. Consequently, the door fits snug within the open mouth. The storage compartment is beneath the hook-up compartment.

Six, the storage compartment includes a hinged storage compartment door mounted to be manually opened and closed to uncover and cover the retracted waste discharge hose, accessing the hose upon manually opening the door and preventing access and concealing the hose upon manually closing the storage compartment door. The door has external surfaces exposed to view that are flush with, and adjacent to, surfaces of the vehicle's surrounding exterior side upon door closure. The door has the same cross-sectional shape as the running board section and the same surface appearance as the external surfaces of the side of the vehicle. Thus with door closure, the storage compartment door is undistinguished from the external surfaces and the retracted waste discharge hose is concealed.

Seven, upon closure of the utility hook-up compartment door, the first and second strip portions are assembled into a unified streamlined oblong decorative generally strip wide enough to completely cover the open mouth of the utility outlet hook-up compartment, camouflaging the assembled strip portions within the unified strip itself that are identical except for length.

DESCRIPTION OF THE DRAWING

One embodiment of my recreational vehicle with camouflaged utility outlet hook-up compartment is discussed in detail in back with the accompanying drawing, which is for illustrative purposes only. This drawing includes the following figures (Figs.), with like numerals and letters indicating like parts.

DETAILED DESCRIPTION OF ONE ILLUSTRATIVE EMBODIMENT

FIGS. 1 through 6 depict one embodiment of my recreational vehicle designated by the numeral 10. This vehicle 10 has a forward cab section FCS and a rear passenger section RPS, an exterior side 10a with an elongated strip 12 extending continuously from near the front 10b of the vehicle towards the rear 10c of the vehicle. The strip 12 has a generally rectangular configuration and a width wide enough to cover a hidden compartment holding connectors 17a through 17h, for example, a width from 5 to 8 inches, a thickness from ½ to 1.5 inches, and a length from 9 to 16 feet. The strip 12 is divided into first and second strip portions 12a and 12b, each portion having a uniform width and the same exterior surface in appearance. The strip portions 12a and 12b extend along a common longitudinal linear reference line RL that is parallel to ground upon assembly of the first and second portions to provide an external camouflage effect.

Figure 7:
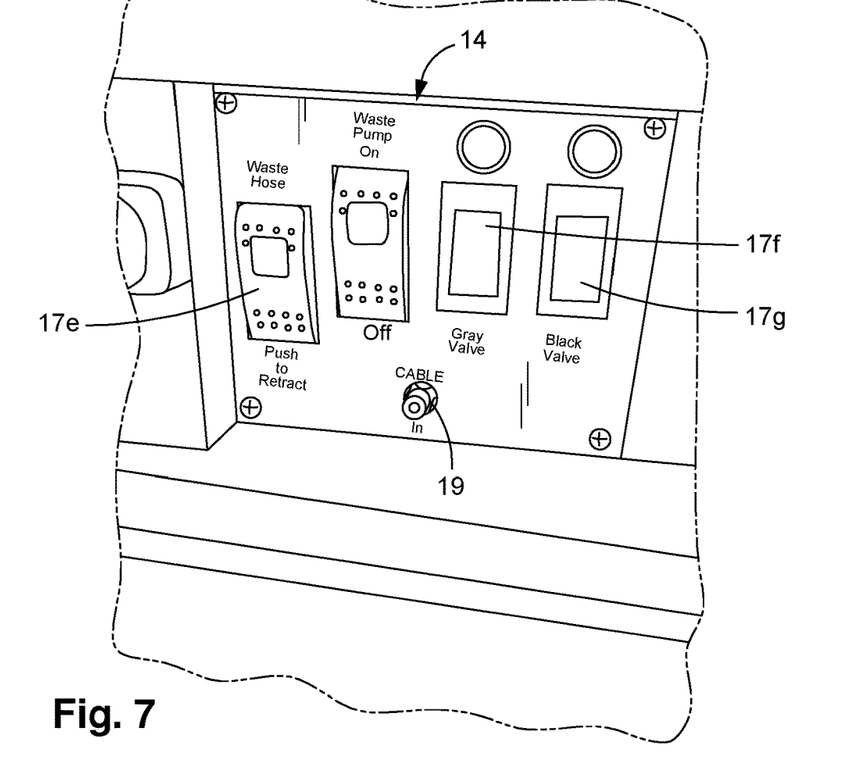
FIG. 7 is an enlarged view of the control panel shown in FIG. 6.

The exterior vehicle side 10a includes a cab section door CSD for entry into the forward cab section FCS of the vehicle. A front wheel W1 is outward of the cab section door CSD and a rear wheel W2 is near the rear passenger section RPS of the vehicle. A hidden utility hook-up compartment 14 has walls with edges ED1 (FIG. 4) forming an open mouth OM1 (FIG. 5) with a predetermined configuration and dimensions, for example, having a rectangular perimeter. Within a recessed stainless steel cubicle 14b (FIG. 4) having a boxlike shape, the utility hook-up compartment 14 holds a series of utility hook-up connectors 17a through 17h. The utility hook-up connectors include the connector inlet 17a for fresh water, the connector inlet 17b for city water, the outside shower connector 17c, the control panel 17d having a switch button 17e (FIG. 7) for controlling the operation of a retractable waste discharge hose H (discussed in greater detail below), a valve switch 17f for black water pump, a valve switch 17g for gray water pump, a connector 17h for electricity, and cable connector 19. The plurality of the utility hook-up connectors 17a through 17h are in a row within the cubicle and are hidden from view upon door closure.

The strip portions 12a and 12b have, except for length, identical configurations and identical surface appearances, and the second portion 12b functions as a door, accessing the utility hook-up compartment 14 upon manually opening the compartment door 12b and preventing access and concealing the utility hook-up compartment upon manually closing the door. The second portion 12b (compartment door) is attached by a linear hinge 15 (FIG. 6) along an edge ED2. The second portion 12b is manually opened by pushing an edges 1 (FIG. 6) of the door portion 12b upward to uncover the hidden utility hook-up connectors 17a through 17h. The second portion 12b is manually closed and cover the utility hook-up compartment 14. As best shown in FIGS. 1 through 4, the strip portions 12a and 12b each have the same cross-sectional shape and dimensions so that, with the closure of the utility hook-up compartment door 12b, these portions extend along the common reference line RL. They comprises stainless steel and their exterior surfaces S1 and S2 are polished to provide a camouflage effect to hide the compartment door upon closure thereof.

Figure 3:
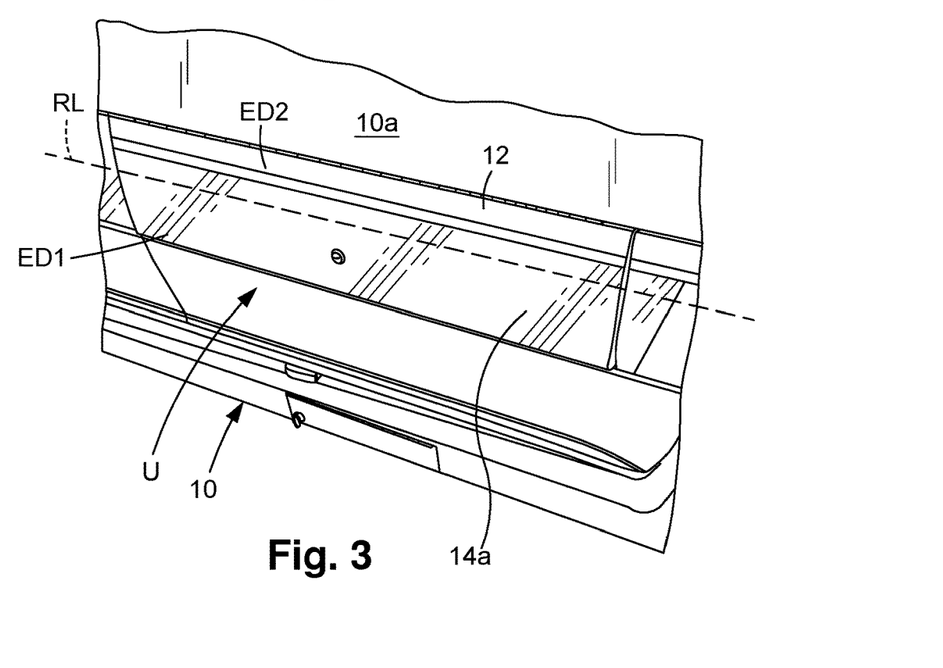
FIG. 3 is a side view of a portion is a side strip shown in FIG. 1 forming a utility outlet compartment door slightly ajar that, when closed, conceals and camouflages the utility hook-up compartment of my recreational vehicle.
Figure 4:
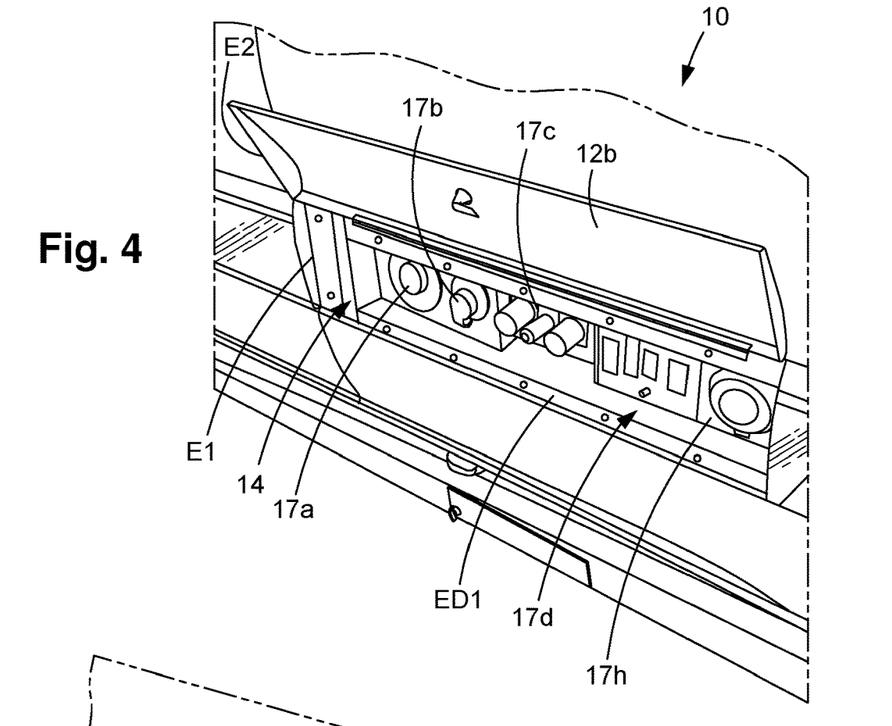
FIG. 4 is a perspective view of the door portion shown in FIG. 3 completely manually opened and held in an open position to expose utility hook-up connectors within the utility hook-up compartment.
Figure 5:
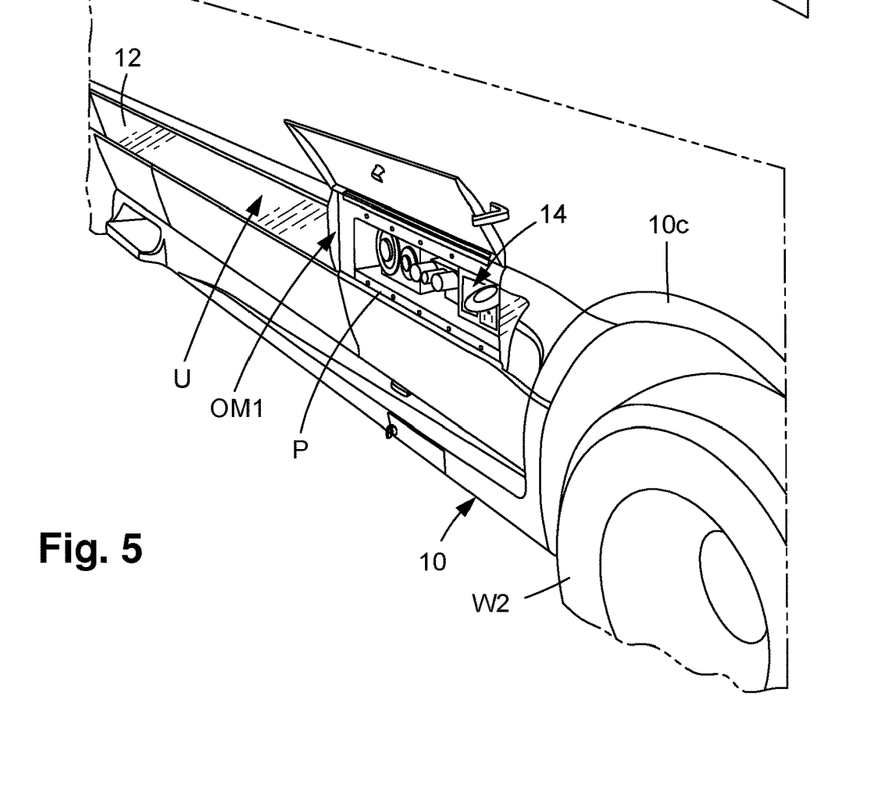
FIG. 5 is a perspective view the door portion shown in FIG. 4 completely opened and held in the open position by a hanger member.
Figure 6:
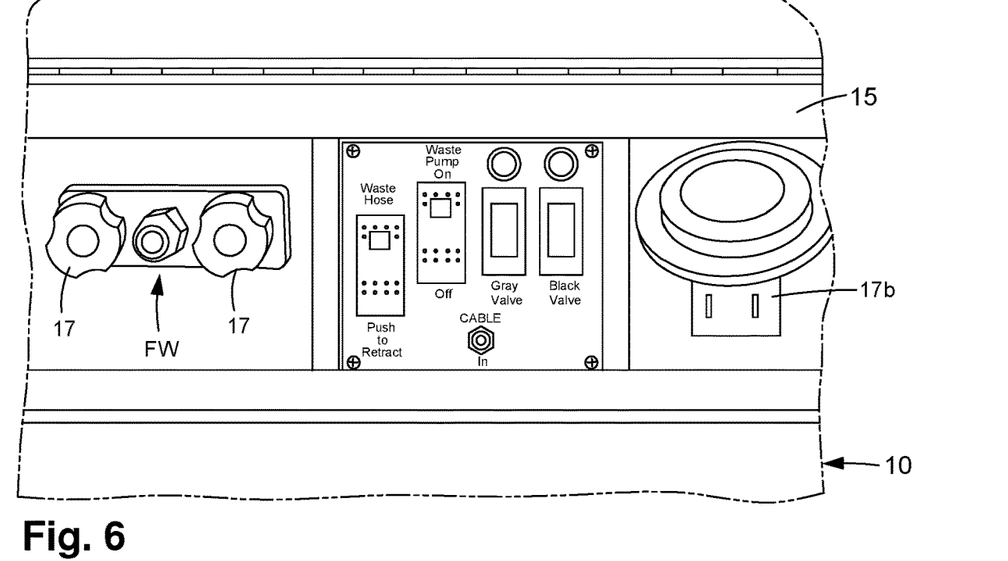
FIG. 6 is a front view with the door portion shown in FIG. 5 open looking into the interior of the utility hook-up compartment showing a control panel positioned a cubicle between hook-up connectors.

In this embodiment of the vehicle 10 illustrated in FIG. 4, adjacent ends E1 and E2, respectively, of the first portion 12a and of the second portion 12b, each have predetermined dimensions and shapes that, upon closure of the utility hook-up compartment door 12b, are aligned and abut to form a rectangular shaped integrated strip unit. In this embodiment, the vehicle 10 has the portions 12a and 12b extending along the common reference line RL that is located between the vehicle's front wheel W1 and rear wheel W2 and is parallel to ground level. Other embodiments may position a reference line in different locations. As best shown in FIGS. 1 and 3, reflects mirror images off the polished exterior surfaces S1 and S2, which may have the same identical surface appearances. Moreover, in the embodiment depicted, the first portion 12a and the second portion 12b are essentially identical expect for length. Linear alignment with closure thus provides a visual camouflage effect hiding the hook-up compartment door 12b upon closure thereof by bringing the first and second portions 12a and 12b into alignment along the common reference line RL. Upon closure of the utility hook-up compartment door 12b, portions 12*a* and 12*b* are assembled into a unified streamlined decorative generally oblong strip wide enough to completely cover the open mouth of the utility outlet hook-up compartment, camouflaging the assembled strip portions within the unified strip itself that are identical except for length.

Figure 8:
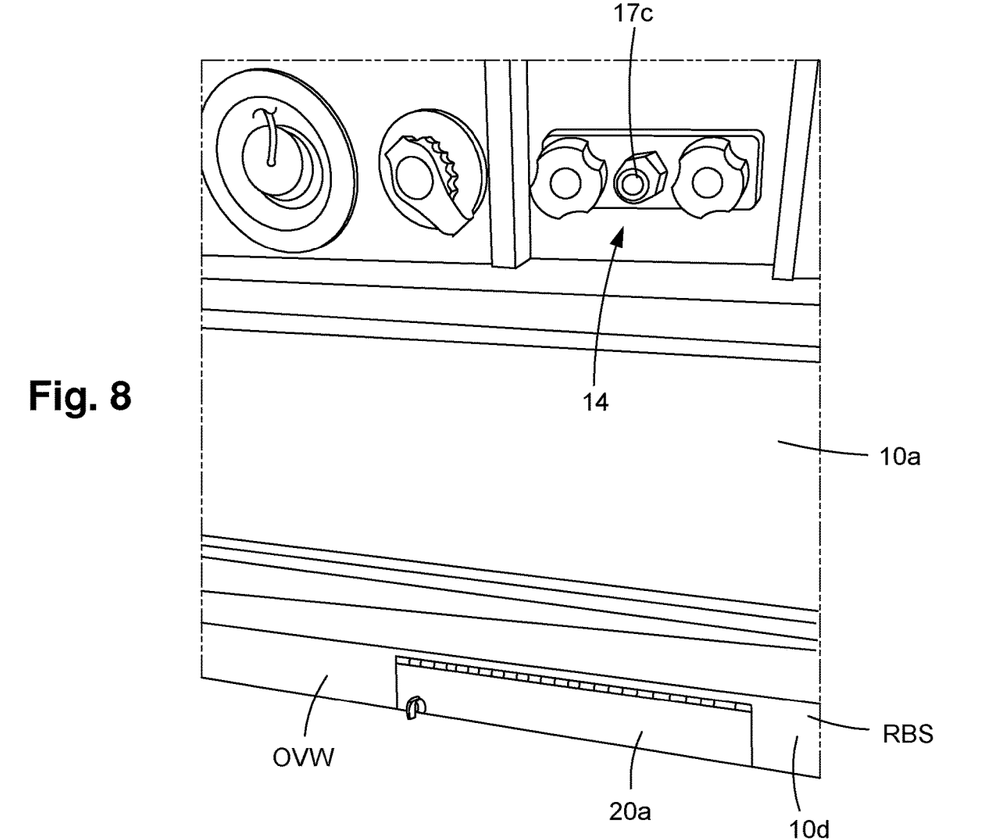
FIG. 8 is a perspective view of a side segment of the vehicle shown in FIG. 1 including a lower portion having a concealed storage compartment with a storage compartment door slightly ajar that, when completely opened, provides access to a stored retracted waste discharge hose.
Figure 9:
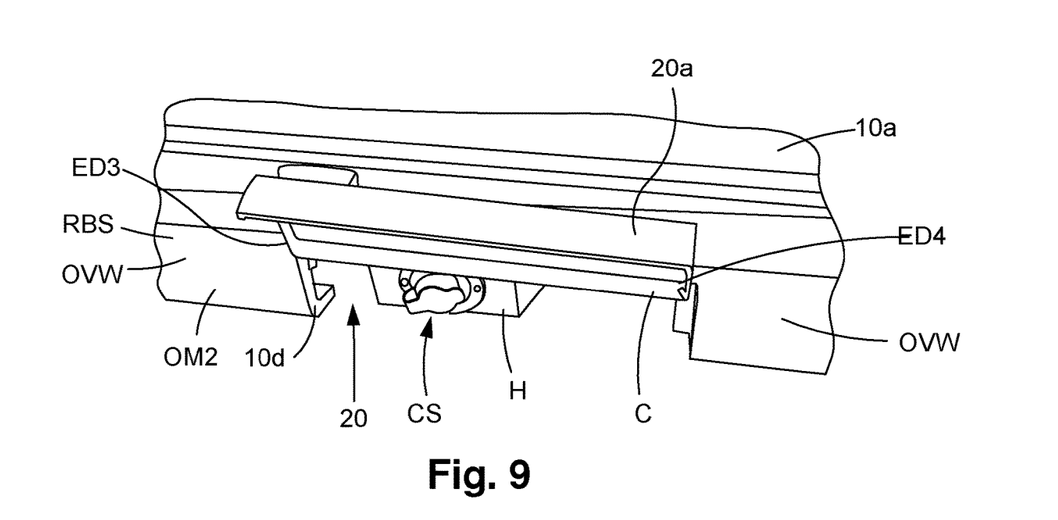
FIG. 9 is a perspective view of the side segment shown in FIG. 8 with the storage compartment door open.

As best shown in FIGS. 8 and 9, the recreational vehicle 10 may include a horizontal running board section RBS (FIG. 1) that forms a bottom portion BP of the exterior side 10*a*. The running board section RBS includes a concealed storage compartment 20 that has a storage compartment door 20*a* configured to be manually opened and closed to uncover and cover a retracted waste discharge hose H, accessing the hose upon manually opening the storage compartment door and preventing access and concealing the hose upon manually closing this door. The storage compartment door 20*a* is in an outer vertical wall OVW of the running board section RBS. The concealed storage compartment 20 comprises a cavity C in which is stored the retracted waste discharge hose H. The cavity C is concealed upon door closure hiding the hose H.

A cutaway segment CS (FIG. 9) in the outer vertical wall OVW of the running board section has edges defining an open mouth with a predetermined configuration and dimensions. The hinged door has a perimeter with a predetermined configuration and dimensions the same as this open mouth so that, upon closure, the walls forming the perimeter of the open mouth are adjacent the perimeter of the compartment door, but not so close to jam. The storage compartment door 20*a* has a perimeter with a predetermined configuration and dimensions the same as the open mouth OM. Consequently, upon closure of the storage compartment door 20*a*, the wall edges ED3 and ED4 are next to the perimeter of this door so the door fits snug within the open mouth OM. The storage compartment 20 is directly beneath the hook-up compartment 14 and spaced therefrom a distance from 8 to 20 inches. The retracted waste discharge hose H is assembled within the storage compartment in a configuration enabling actuation by electricity.

SCOPE OF THE INVENTION

The above presents a description of the best mode I contemplate of carrying out my recreational vehicle, and of the manner and process of making and using it in such full, clear, concise, and exact terms as to enable a person skilled in the art to make and use. My recreational vehicle is, however, susceptible to modifications and alternate constructions from the illustrative embodiment discussed above which are fully equivalent. Consequently, it is not the intention to limit my recreational vehicle to the particular embodiment (disclosed. On the contrary, my recreational vehicle intention is to cover all modifications and alternate constructions coming within the spirit and scope of my recreational vehicle as generally expressed by the following claims, which particularly point out and distinctly claim the subject matter of my invention:

The invention claimed is:

1. A recreational vehicle comprising
a forward cab section and a rear passenger section joined by an exterior side,
a utility hook-up compartment in said exterior side,
a utility hook-up compartment door mounted to be manually opened and closed to uncover and cover an open mouth of the utility hook-up compartment,
a recessed cubicle at said open mouth retaining within a plurality of utility hook-up connectors that are hidden from view upon closure of said door,
an external elongated strip extending from near the front of the vehicle towards the rear of the vehicle that is divided into a first portion and a second portion, said first portion of the strip forming an exterior surface of the utility hook-up compartment door,
said first and second portions being adjacent and aligned along a common longitudinal linear reference line that is parallel to ground when the utility hook-up compartment door is closed to create camouflage effect upon alignment hiding the presence of the utility hook-up compartment door,
said first and second strip portions moving from alignment to non-alignment upon opening said compartment door,
accessing the hook-up compartment upon manually opening the door and preventing access and concealing the utility hook-up compartment upon manually closing said door.

2. The recreational vehicle of claim 1 including
a running board section forming a portion of the bottom of the lower horizontal section of said exterior side and having an outer vertical wall, and
a concealed storage compartment hidden behind the outer vertical wall and including a cavity in which is stored a retracted waste discharge hose,
said concealed storage compartment including a door configured to be manually opened and closed to uncover and cover the retracted waste discharge hose, accessing the hose upon manually opening the door and preventing access and concealing the hose upon manually closing the storage compartment door.

3. The recreational vehicle of claim 2 where the exterior side of the vehicle is a side that includes a cab section door for entry into the cab section of the vehicle and a front wheel outward of the cab section door and a rear wheel near the rear of the rear passenger section of the vehicle.

4. The recreational vehicle of claim 1 where the utility hook-up compartment has walls with edges forming the open mouth with a predetermined configuration and dimensions and the compartment door has a perimeter with a predetermined configuration and dimensions the same as said open mouth so that, upon closure, the wall edges are next to the perimeter of the compartment door so the door fits snug within the open mouth.

5. The recreational vehicle of claim 2 where the storage compartment is directly beneath the hook-up compartment and spaced therefrom a distance from 8 to 20 inches.

6. The recreational vehicle of claim 2 where the retracted waste discharge hose is assembled within the storage compartment in a configuration enabling actuation by electricity.

7. The recreational vehicle of claim 1 where the strip is has a mirror exterior surface.

8. The recreational vehicle of claim 7 where the strip has generally rectangular configuration and a width from 5 to 8 inch, a length from 9 to 16.

9. The recreational vehicle of claim 1 where the utility hook-up connectors within the cubicle include at least a connector for fresh water and a connector for electricity.

10. The recreational vehicle of claim 1 the recessed cubicle has a boxlike shape with stainless interior surfaces, and the hook-up connectors are aligned in a row along a vertical interior back wall.

11. A recreational vehicle including
an exterior side having an elongated strip extending continuously from near a front of the vehicle towards a rear of the vehicle, said strip divided into first and second separate portions, each portion having a uniform width, the same cross-sectional configuration, and the same exterior surface, said first portion of the strip forming at least in part a utility hook-up compartment door that is manually opened and closed to uncover and cover a utility hook-up compartment in said side of the vehicle, accessing the hook-up compartment upon manually opening the compartment door and preventing access and concealing said hook-up compartment upon manually closing said door, said first and second portions being adjacent and aligned along a common longitudinal linear reference line that is parallel to ground when the utility hook-up compartment door is closed to create camouflage effect upon alignment hiding the presence of the utility hook-up compartment door, and said first and second strip portions moving from alignment to non-alignment upon opening said compartment door.

12. The recreational vehicle of claim 11 including a storage compartment in the exterior side beneath the utility hook-up compartment and separate from and beneath the strip, said storage compartment storing therein a retracted waste discharge hose and including a storage compartment door mounted to be manually opened and closed to uncover and cover the retracted waste discharge hose, accessing the hose upon manually opening the door and preventing access and concealing the hose upon manually closing the storage compartment door.

13. A recreational vehicle including
an exterior side of the vehicle having an elongated strip extending from near the front of the vehicle towards the rear of the vehicle, said vehicle having a rear passenger section, a forward cab section including a cab door for entry into the cab section and a front wheel outward of the cab door and a rear wheel near the rear of the rear passenger section, said strip having first and second portions, the first portion comprising a hook-up compartment door manually opened and closed to uncover and cover a utility hook-up compartment in said side of the vehicle, accessing the hook-up compartment upon manually opening the hook-up compartment door and preventing access and concealing the hook-up compartment upon manually closing the hook-up compartment door, said hook-up compartment comprising a recessed cubicle having a plurality of utility hook-up connectors within the cubicle that are hidden from view upon closure of the hook-up compartment door, said first and second portions of the strip have
(a) adjacent ends with predetermined dimensions and shapes that, upon closure of the hook-up compartment door, are aligned and abut to form a unit extending between the wheels along a common longitudinal reference line, and
(b) exterior surfaces of said portions having the same predetermined reflective surface that provides a visual camouflage effect hiding the hook-up compartment door upon closure thereof to bring the first and second portions into alignment along said common longitudinal reference line, and a concealed storage compartment including a storage compartment door configured to be manually opened and closed to uncover and cover a retracted waste discharge hose, accessing the hose upon manually opening the storage compartment door and preventing access and concealing the hose upon manually closing the storage compartment door, said storage compartment door having external surfaces exposed to view that are flush with, and adjacent to, surfaces of the surrounding exterior surfaces of the running board section, have the same cross-sectional shape and dimensions as the running board section and the same surface appearance as adjacent external surfaces of the running board section so that, with door closure to conceal said hose, the storage compartment door is undistinguished from said adjacent external surfaces of the running board section, and said utility hook-up compartment having walls with edges forming an open mouth with a predetermined configuration and dimensions and the hook-up compartment door has a perimeter with a predetermined configuration and dimensions the same as said open mouth, so that upon closure of the hook-up compartment door, the wall edges thereof are next to the perimeter of the compartment door so said hook-up compartment door fits snug but not jam within the open mouth.

14. The recreational vehicle of claim 13 where the strip is has a mirror exterior surface and a generally rectangular configuration with a width from 5 to 8 inches.

15. The recreational vehicle of claim 14 said first and second strip portions have an identical exterior appearance except for length, the first portion functioning as a hook-up compartment door manually opened and closed to uncover and cover a utility hook-up compartment in said side of the vehicle having a plurality of utility hook-up connectors within said compartment that are hidden from view upon closure of the hook-up compartment door.

16. A recreational vehicle comprising
an exterior side of the vehicle having an elongated generally rectangular strip extending from near the front of the vehicle towards the rear of the vehicle, said vehicle having a forward cab section and a rear passenger section, said strip divided into first and second strip portions with identical exterior appearance except for length, the first portion functioning as a hook-up compartment door manually opened and closed to uncover and cover a utility hook-up compartment in said side of the vehicle having a plurality of utility hook-up connectors within said compartment that are hidden from view upon closure of the hook-up compartment door, said hook-up compartment door being attached to the side of the vehicle by a hidden internal linear hinge positioned along a top of the utility hook-up compartment, a lower free edge of the hook-up compartment door enables the door to be manually lifted upward to allow access to the hook-up compartment, and prevents access and conceals the hook-up compartment upon manually closing the hook-up compartment door, said first and second portions of the strip having
(a) adjacent ends with predetermined dimensions and shapes that, upon closure of the hook-up compartment door, are aligned and abut to form a rectangular shaped integrated unit extending between the wheels along a common linear longitudinal reference line that is parallel to ground level, and
(b) exterior surfaces of said portions having the same mirror surface that provides a visual camouflage effect hiding the hook-up compartment door upon closure thereof to bring the first and second portions into alignment along said common longitudinal reference line.

17. A recreational vehicle comprising an external longitudinal linear strip extending along an exterior sidewall of the vehicle from near a front of the vehicle and terminating near the rear of the vehicle, said strip divided into a first portion and a second portion each having exterior surfaces with the same appearance, said first portion covering an open mouth of a utility hook-up compartment recessed within said exterior side wall and retaining a series of different type of utility hook-up connectors aligned in a row and having outer ends that terminate inward of said open mouth, said first strip portion functioning as a door for the utility hook-up compartment that is mounted to be manually opened and closed to uncover and cover the open mouth of the utility hook-up compartment to access the utility hook-up connectors therein, said first portion functioning as a door overlying and covering the open mouth with closure, and upon manually moving from a closed position that entirely covers said open mouth and hides from view said utility hook-up connectors to an open position uncovering and exposing the utility hook-up connectors, with the first portion functioning as a closed door, said first and second portions are adjacent and aligned along a common longitudinal linear reference line that is parallel to ground, presenting to a viewer both exterior surfaces with the same appearance that match to create a visual camouflage effect completely concealing the presence of the utility hook-up compartment, upon door closure said first and second portions are assembled into a unified streamlined decorative strip having a predetermined size to completely cover the open mouth, hiding within the unified strip itself the hook-up compartment door upon the first portion functioning as a closed door.

18. The recreational vehicle of claim 17 where the exterior surfaces of the first and second portions are mirrored.

19. The recreational vehicle of claim 18 where the exterior surfaces lie in the same plane upon door closure.

20. The recreational vehicle of claim 18 including a storage compartment in the exterior side beneath the utility hook-up compartment and separate from and beneath the strip, said storage compartment storing therein a retracted waste discharge hose and including a storage compartment door mounted to be manually opened and closed to uncover and cover the retracted waste discharge hose, accessing the hose upon manually opening the door and preventing access and concealing the hose upon manually closing the storage compartment door.

* * * * *